United States Patent [19]
Hirano et al.

[11] Patent Number: 5,195,930
[45] Date of Patent: Mar. 23, 1993

[54] SELF-BALANCED DRIVE SHAFT ASSEMBLY

[75] Inventors: Yoshinori Hirano, Yokohama, Japan; Hiroshi Okuzumi, New York, N.Y.

[73] Assignee: Nissan Motor Co., Ltd., Yokohama, Japan

[21] Appl. No.: 619,346

[22] Filed: Nov. 29, 1990

[30] Foreign Application Priority Data

Nov. 30, 1989 [JP] Japan .................................. 1-311304

[51] Int. Cl.⁵ .......................... F16C 1/04; F16D 3/26; F16D 3/78
[52] U.S. Cl. ...................... 464/180; 464/93; 464/113; 464/147
[58] Field of Search ...................... 464/69, 87, 88, 89, 464/93, 92, 147, 150, 180, 113; 74/573 R

[56] References Cited
U.S. PATENT DOCUMENTS
4,905,776  3/1990  Beynet et al. ...................... 464/180

FOREIGN PATENT DOCUMENTS

| 7104765 | 8/1971 | Fed. Rep. of Germany. |
| 2851293 | 5/1979 | Fed. Rep. of Germany. |
| 52-140758 | 11/1977 | Japan. |
| 59-208223 | 11/1984 | Japan .................................. 464/180 |
| 2008720 | 6/1979 | United Kingdom. |

OTHER PUBLICATIONS

"Automotive Engineering Handbook", Shadan Hohjin Jidousha Gijutukai, Jun. 1987, pp. 25-29.

Primary Examiner—Daniel P. Stodola
Assistant Examiner—William G. Battista, Jr.
Attorney, Agent, or Firm—Foley & Lardner

[57] ABSTRACT

A self-balanced drive shaft assembly comprises a cylindrical shaft having an axially extending cylindrical bore formed therein; a small amount of liquid contained in the bore of the cylindrical shaft, the liquid being movable in the bore in response to movement of the shaft; and two joints operatively connected to axially opposed ends of the shaft respectively. At least one of the joints permits a pivotal movement of the shaft about a pivot point defined by the other joint.

19 Claims, 6 Drawing Sheets

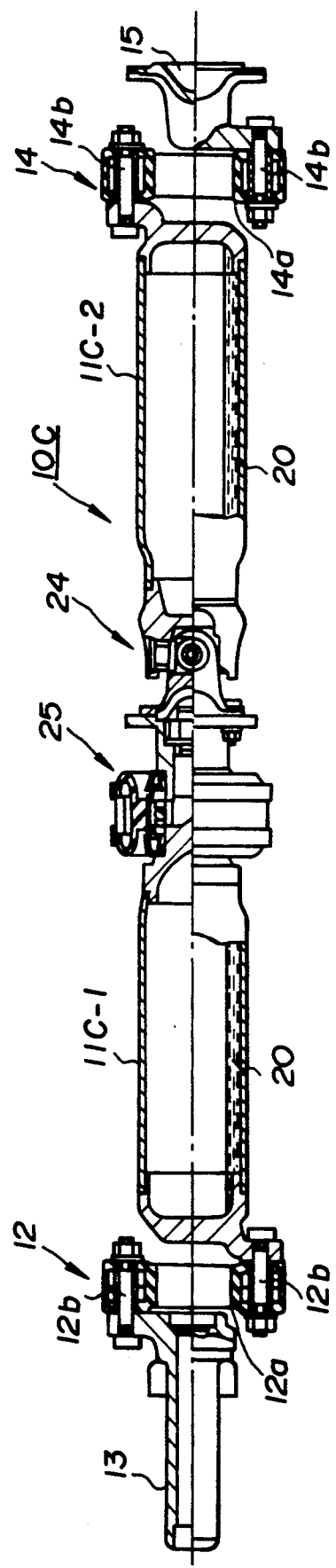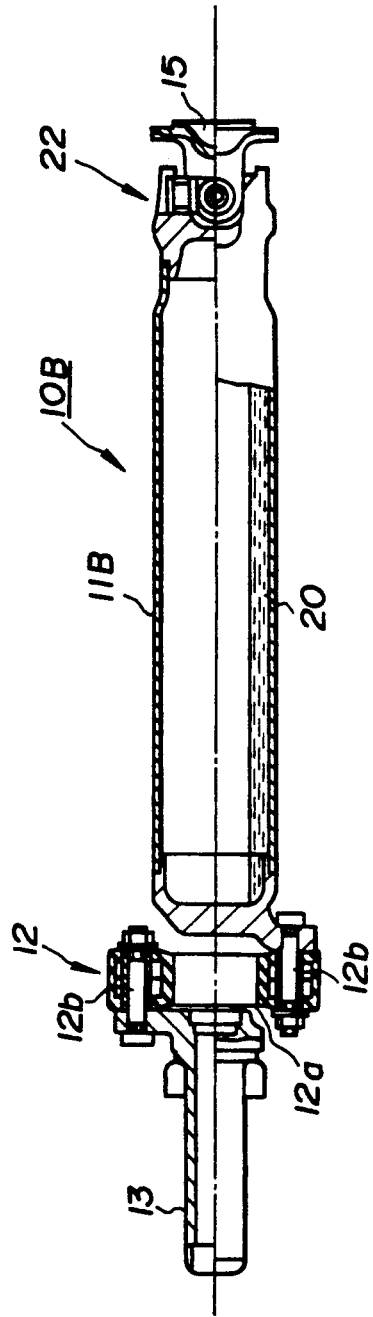
FIG. 7
FIG. 6

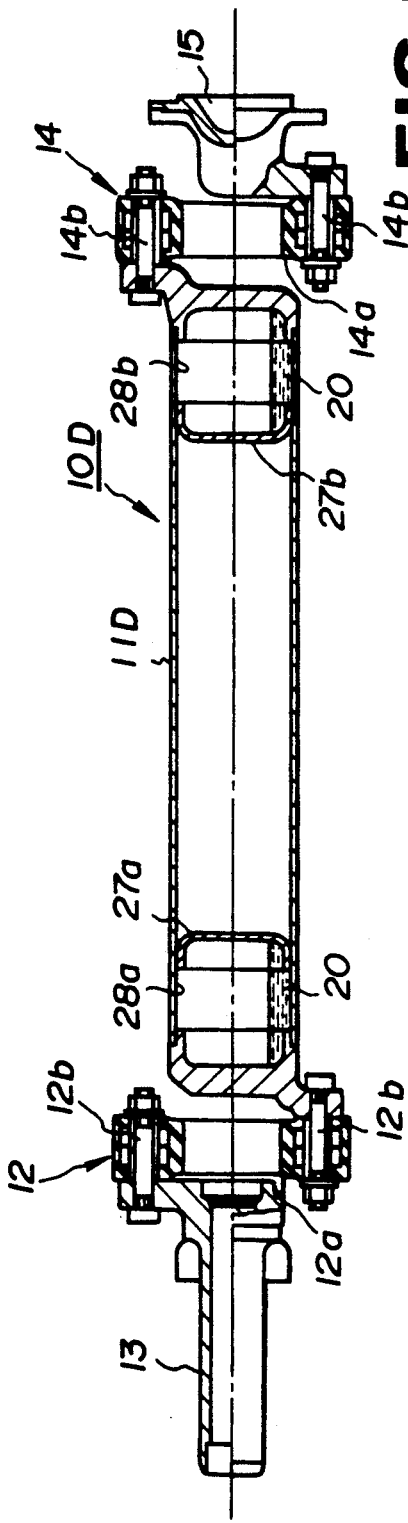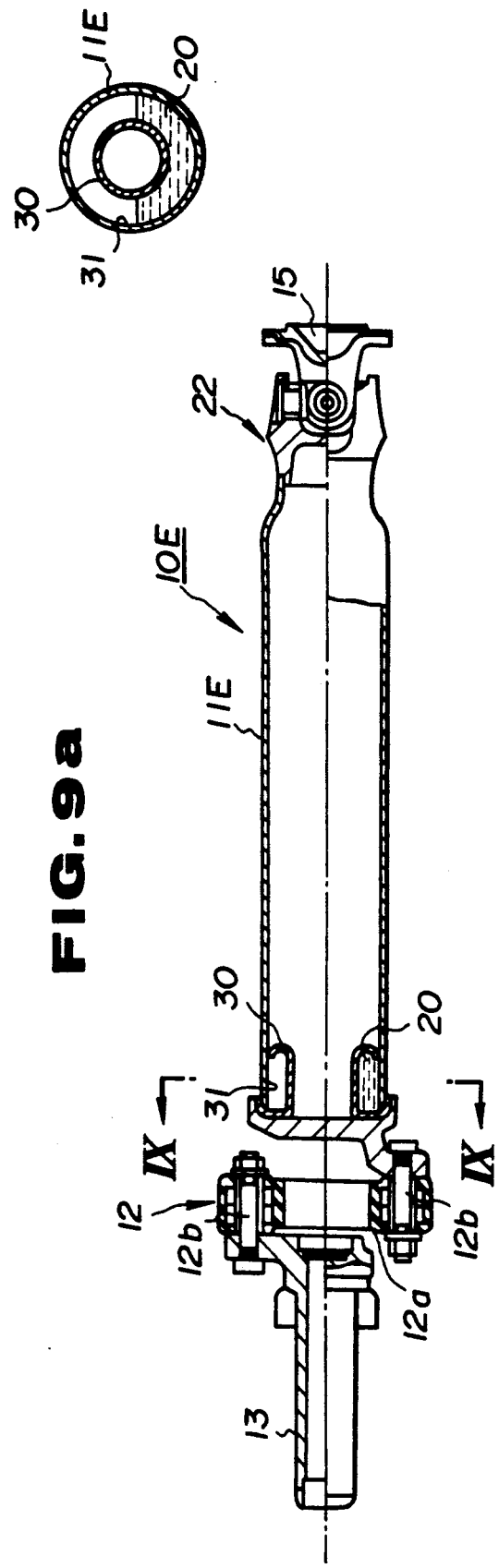

SELF-BALANCED DRIVE SHAFT ASSEMBLY

BACKGROUND OF THE INVENTION

1. Field of the Invention

The present invention relates to drive shaft assemblies for a wheeled motor vehicle, and more particularly, to drive shaft assemblies of a type which are constructed to assure a balanced rotation thereof for minimizing undesired vibration of the motor vehicle in which the drive shaft assembly is used.

2. Description of the Prior Art

Hitherto, various types of automotive drive shaft assemblies have been proposed and put into practical use, some of which are disclosed in "AUTOMOTIVE ENGINEERING HANDBOOK" (issued June 1987 from Shadan Hohjin Jidousha Gijutukai).

In order to clarify the task of the present invention, one conventional drive shaft assembly for a wheeled motor vehicle will be described with reference to FIG. 13.

The drive shaft assembly 100 shown in the drawing is of a double joint type, which comprises a shaft proper 200 whose one end is connected through a joint unit 300 to an output shaft (not shown) of a power plant which includes an engine and a transmission. The other end of the shaft proper 200 is connected through another joint unit 400 to an input shaft (not shown) of a terminal speed reduction gear. Accordingly, the power produced by the engine is transferred through the drive shaft assembly 100 to the terminal reduction gear and then to driven road wheels (not shown).

Designated by numeral 500 is a balance weight which is secured to a certain portion of the shaft proper 200 to reduce vibrations of the shaft proper 200 during rotation of the same. The portion to which the balance weight 500 must be fixed is detected with the aid of special equipment.

However, as is described hereinabove, the abovementioned conventional drive shaft assembly requires troublesome and skilled work for restoring the balance of the same. This causes an increase in production cost of the drive shaft assembly. Furthermore, such a balance restoring method has a certain inevitable limitation in reducing the vibrations of the assembly.

SUMMARY OF THE INVENTION

It is therefore an object of the present invention to provide a self-balanced drive shaft assembly which is free of the above-mentioned drawbacks.

According to the present invention, there is provided a drive shaft assembly which comprises a cylindrical shaft having an axially extending cylindrical bore formed therein; a given amount of liquid contained in the bore of the cylindrical shaft, the liquid being movable in the bore in response to movement of the shaft; two joints connected to axially opposed ends of the shaft respectively; and means for permitting a radial displacement between one of said joints and the corresponding end of the shaft thereby to allow a pivotal movement of the shaft about a pivot point defined by the other joint.

BRIEF DESCRIPTION OF THE DRAWINGS

Other objects and advantages of the present invention will become apparent from the following description when taken in conjunction with the accompanying drawings, in which:

FIG. 4b is a sectional view taken along the line IV—IV of FIG. 4a;

FIG. 5b is a sectional view taken along the line V—V of FIG. 5a;

FIG. 6 is a sectional view of a self-balanced drive shaft assembly which is a second embodiment of the present invention;

FIG. 7 is a sectional view of a self-balanced drive shaft assembly which is a third embodiment of the present invention;

FIG. 8 is a sectional view of a self-balanced drive shaft assembly which is a fourth embodiment of the present invention;

FIG. 9a is a sectional view of a self-balanced drive shaft assembly which is a fifth embodiment of the present invention;

FIG. 9b is a sectional view taken along the line IX—IX of FIG. 9a;

DETAILED DESCRIPTION OF THE INVENTION

Figure 1:
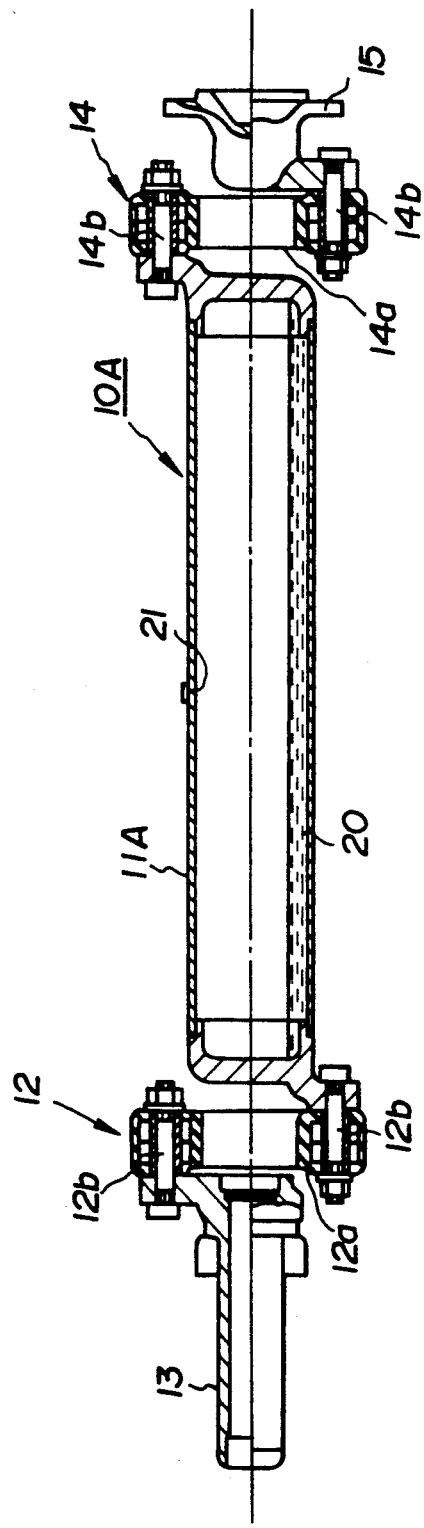
FIG. 1 is a sectional view of a self-balanced drive shaft assembly which is a first embodiment of the present invention.

Referring to FIG. 1 of the drawings, there is shown a self-balanced drive shaft assembly 10a which is a first embodiment of the present invention.

The drive shaft assembly 10a is of a double joint type, which comprises a cylindrical hollow shaft proper 11a. One end of the shaft proper 11a is connected through a so-called "elastic axis joint" 12 to an output shaft 13 of a power plant which includes an engine and a transmission. The other end of the shaft proper 11a is connected through another elastic axis joint 14 to a flange 15 which is connected to a companion flange of a terminal speed reduction gear (not shown).

Each of the joints 12 and 14 comprises an annular elastic member 12a or 14a constructed of, for example, rubber or the like, and a plurality (six, in the illustrated example) of bolts 12b or 14b. The bolts 12b or 14b are held by the annular elastic member 12a or 14a at equally spaced intervals.

As is understood from the drawing, three of the alternately arranged three of the bolts 12b or 14b are arranged to connect the end of the shaft proper 11a to the annular elastic member 12a or 14a, while, the other three alternately arranged bolts 12b or 14b are arranged to connect the output shaft 13 or the flange 15 to the annular elastic member 12a or 14a.

Although not shown in the drawing, every neighbouring two of the bolts 12b or 14b are wound by respective fiber bands which are embedded in the elastic member 12a or 14a. This arrangment is shown in Japanese Patent First Provisional Publication No. 52-140758.

Thus, the shaft proper 11a and the output shaft 13 (or the shaft proper 11a and the flange 15) can rotate together about their common axis, and they are resiliently displaceable from each other in both axial and radial directions.

Figure 2:
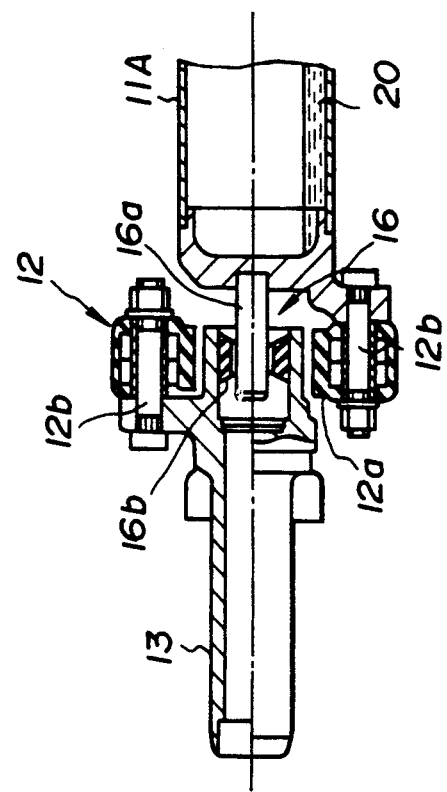
FIG. 2 is partial sectional view of a self-balanced drive shaft assembly, which is a modification of the first embodiment.

If desired, the drive shaft assembly 10a of the first embodiment may be somewhat modified as shown in FIG. 2. That is, in this modification, a centering device 16 is employed, which comprises a pin 16a which coaxially extends from the shaft proper 11a and an elastic ring member 16b which is coaxially connected to the output shaft 13 and coaxially disposed about the pin 16a. In the illustrated modification, the elastic ring member 16b is coaxially and tightly disposed in a coaxial bore (no numeral) formed in the output shaft 13.

Within the hollow shaft proper 11a, there is contained a small amount of liquid 20. The liquid 20 may be water, water with rust inhibitor (such as water with ethylene glycol), oil, or the like.

For pouring the liquid 20 into the shaft proper 11a, the latter is provided with a small opening 21. The opening 21 is sealingly covered with a small metal piece which is welded to the shaft proper 11a. If desired, a rivet may be used for sealing the opening 21.

In the following, operation of the first embodiment will be described with reference to FIGS. 3 to 5.

Figure 3:
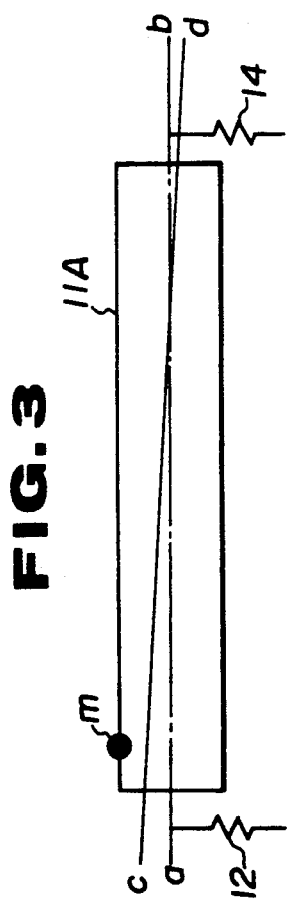
FIG. 3 is a schematic view of the first embodiment, showing operation of the same.

For ease of understanding, the description will be commenced with respect to the condition of FIG. 3 wherein the hollow shaft proper 11a has no liquid contained therein and unbalance exists in the hollow shaft proper 11a. The unbalance mass is designated by "m" in the drawing and the shaft center axis of the hollow shaft proper 11a is designated by "a-b".

When power is transferred from an engine to the drive shaft proper 11a, the shaft proper 11a is forced to rotate about a principal axis of inertia "c-d" which is displaced from the shaft center axis "a-b" by a distance determined by the unbalance mass "m". The displacement is caused by not only the existence of the unbalance mass "m" but also provision of the elastic joints 12 and 14.

Because the rotation of the shaft proper 11a is made about the principal axis of inertia "c-d", the effect of the unbalance mass "m" is small, and thus a large unbalance exciting force is not produced.

However, the provision of the displacement between the two axes "a-b" and "c-d" causes marked deformation of the elastic members 12a and 14a of the joints 12 and 14, which causes generation of an exciting force of primary rotation and thus causes undesired vibration of the associated motor vehicle.

Figure 4A:
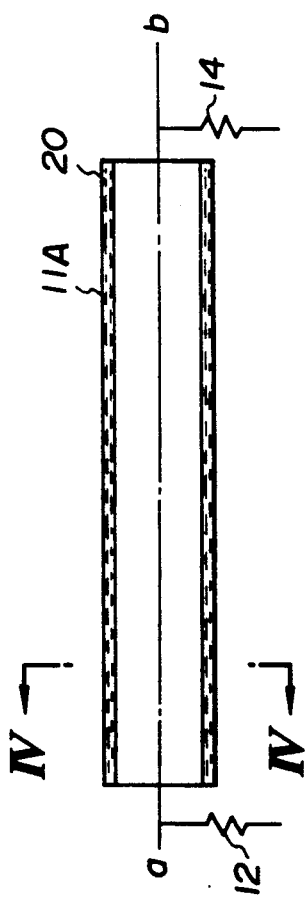
FIG. 4a is a schematically illustrated sectional view of the first embodiment, showing one condition of the same.
Figure 4B:
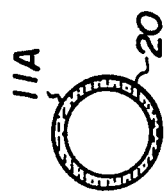

The following description will be directed to a condition of FIGS. 4a and 4b wherein the hollow shaft proper 11a contains a small amount of liquid 20 and unbalance does not exist in the shaft proper 11a.

When the shaft proper 11a is rotated at a speed faster than a certain speed, the liquid 20 is forced to form on the inner cylindrical surface of the shaft proper 11a a uniform layer thereof as is understood from FIGS. 4a and 4b. It is to be noted that under this condition, the liquid 20 does not cause unbalanced rotation of the shaft proper 11a, that is, the principal axis of inertia "c-d" is coincident with the shaft center axis "a-b" in this case.

Figure 5A:
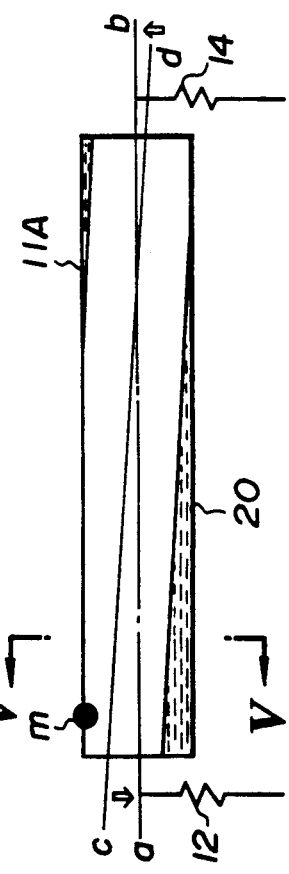
FIG. 5a is a view similar to FIG. 4a, but showing another condition of the first embodiment.
Figure 5B:
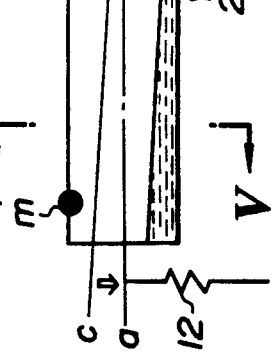

The following description will be directed to the condition of FIGS. 5a and 5b wherein the hollow shaft proper 11a contains a small amount of liquid 20 and unbalance exists in the shaft proper 11a. That is, unbalance mass "m" exists.

When the shaft proper 11a is rotated, there is produced a force by which the principal axis of inertia "c-d" is biased away from the shaft center axis "a-b", that is, toward the unbalance mass "m". However, as is seen from FIGS. 5a and 5b, under this condition, the shaft proper 11a becomes asymmetric with respect to the principal axis of inertia "c-d", and thus, the liquid 20 having a level in parallel with the axis "c-d" is moved to a position which is opposite to the position where the unbalance mass "m" exists with respect to the axis "c-d". This, means that, under rotation of the shaft proper 11a, the unbalance mass "m" and the liquid 20 placed at the opposite position cancel each other thereby correcting the unbalanced rotation of the shaft proper 11a.

That is, the principal axis of inertia "c-d" is not largely displaced from the shaft center axis "a-b", and thus, the undesired deformation of the elastic members 12a and 14a of the joints 12 and 14 is reduced. Thus, undesired unbalance exciting force is reduced to the minimum value and the displacement exciting force, which would cause the vibration of the associated motor vehicle, is reduced to the minimum value.

Accordingly, in this embodiment, even when unbalance exists in the shaft proper 11a, the undesired vibration of the associated motor vehicle is suppressed or at least reduced to the minimum value. Because the work required to eliminate the unbalance mass from the shaft proper 11a becomes unnecessary, the production cost of the drive shaft assembly can be reduced.

Referring to FIG. 6, there is shown a self-balanced drive shaft assembly 10B which is a second embodiment of the present invention.

Since the second embodiment is similar to the above-described first embodiment, only parts which are different from those of the first embodiment will be described in the following for simplification of description and the same parts are denoted by the same numerals.

As is seen from FIG. 6, in this second embodiment, a known Cardan joint 22 is used to connect the shaft proper 11B to the flange 15. Thus, the right end of the shaft proper 11B (as viewed in the drawing) is not permitted to move in a radial direction.

However, as has been described with reference to FIGS. 5a and 5b, the displacement of the principal axis of inertia "c-d", from the shaft center axis "a-b" can be similarly small in this second embodiment. Accordingly, substantially the same advantages as those of the first embodiment are also obtained in the second embodiment.

Referring to FIG. 7, there is shown a self-balanced drive shaft assembly 10C of a third embodiment of the present invention.

The drive shaft assembly 10C of this embodiment is of a triple-joint type, which comprises a first hollow cylindrical shaft proper 11C-1 and a second hollow cylindrical shaft proper 11C-2. An outside end of the first shaft proper 11C-1 is connected through an elastic joint 12 to an output shaft 13 of the power plant, and an outside end of the second shaft proper 11C-2 is connected through another elastic joint 14 to a flange 15 which is connected to a companion flange of a terminal speed reduction gear (not shown). Inside ends of the first and second shafts proper 11C-1 and 11B are connected through a known Cardan joint 24. Designated by numeral 25 is an annular bearing device through which a part of the first shaft proper 11C-1 is connected to a vehicle body (not shown). Within each shaft proper 11C-1 or 11C-2, there is contained a small amount of liquid 20.

Because of provision of the elastic joints 12 and 14 and the unique behavior of the liquid 20 in each shaft proper 11C-1 or 11C-2, balanced rotation of the assembly 10 is also obtained in this third embodiment.

If desired, a modification may be employed wherein the elastic joints 12 and 14 are replaced with Cardan joints and the Cardan joint 24 is replaced with an elastic joint.

Referring to FIG. 8, there is shown a self-balanced drive shaft assembly 10D of a fourth embodiment of the present invention.

The drive shaft assembly 10D of this embodiment is substantially the same as that of the afore-mentioned first embodiment (FIG. 1) except for the construction of the cylindrical shaft proper 11D.

As is shown in the drawing, two partition walls 27a and 27b are sealingly disposed in the hollow shaft proper 11D to define at opposed end portions respective chambers 28a and 28b. Each chamber 28a or 28b contains a small amount of liquid 20.

That is, in this embodiment, the liquid containing chamber 28a or 28b is located at a position where the displacement of the principal axis of inertia "c-d" from the shaft center axis "a-b" exhibits the maximum value. Since, in embodiment, the shaft proper 11D is prevented from making an extremely uneven distribution of the liquid, quick response to speed change is obtained.

Referring to FIGS. 9a and 9b, there is shown a self-balanced drive shaft assembly 10E of a fifth embodiment of the present invention.

The drive shaft assembly 10E of this embodiment is substantially the same as that of the afore-mentioned second embodiment (FIG. 6) except for the construction of the cylindrical shaft proper 11E.

As is shown in the drawings, an annular grooved member 30 is disposed in one axial end of the shaft proper 11E to define an annular chamber 31. The annular chamber 31 contains a small amount of liquid 20.

Figure 10:
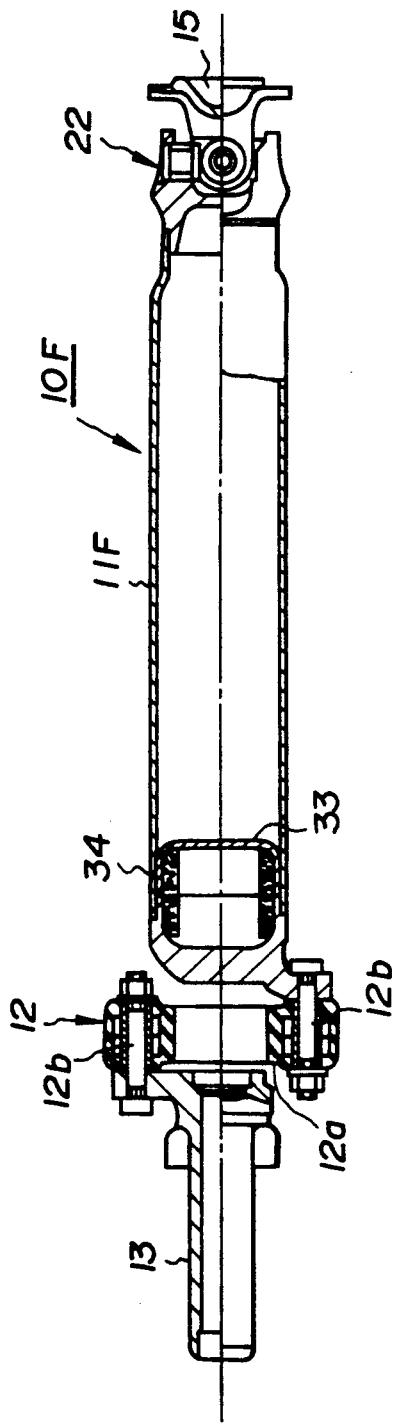
FIG. 10 is a sectional view of a self-balanced drive shaft assembly which is a sixth embodiment of the present invention.

Referring to FIG. 10, there is shown a self-balanced drive shaft assembly 10F of a sixth embodiment of the present invention.

The drive shaft assembly 10F of this embodiment is substantially the same as that of the afore-mentioned second embodiment (FIG. 6) except for the construction of the cylindrical shaft proper 11F.

That is, in this embodiment, a partition wall 33 is sealingly disposed in one axial end portion of the shaft proper 11F to define an enclosed chamber (no numeral). Within the chamber, there is coaxially and tightly disposed an annular porous member 34. The porous member 34 contains a certain amount of liquid.

In this embodiment, relatively even distribution of the liquid is achieved in the shaft proper 11F even when the shaft is not rotating. Thus, the balancing operation of the liquid is quickly carried out when the drive shaft assembly 10F starts to rotate, as compared with the above-mentioned first, second, third, fourth and fifth embodiments. In fact, when the drive shaft proper 11F is motionless, the porous member 34 holds the liquid againt gravitation. However, upon rotation of the shaft proper 11F, the porous member 34 is forced to release the liquid due to centrifugal force applied to the liquid, permitting the liquid to move in the enclosed chamber.

Figure 11:
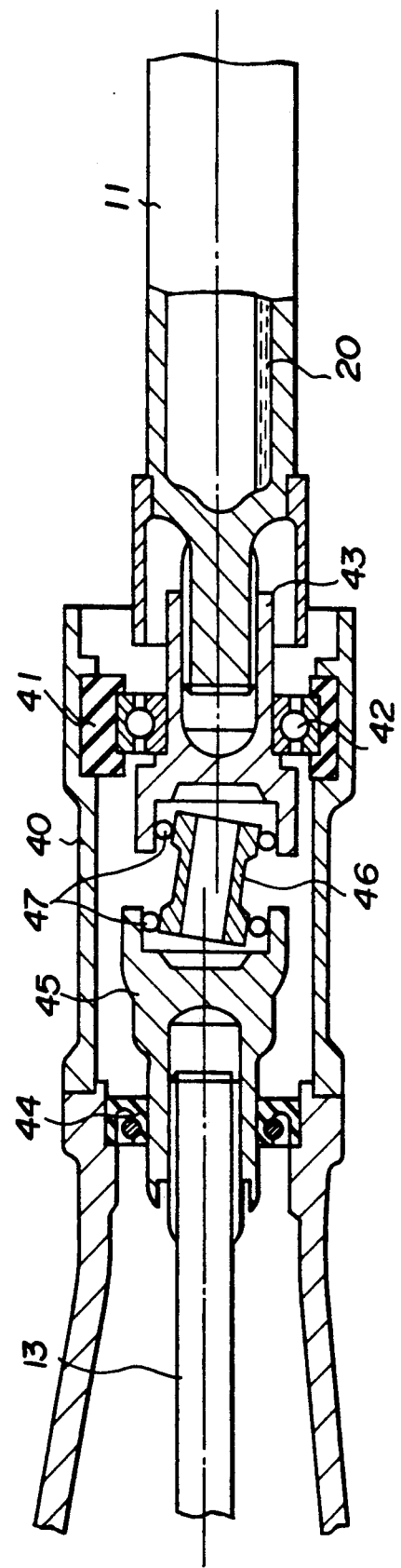
FIG. 11 is an enlarged sectional view of a modified joint which is usable in the present invention.

Referring to FIG. 11, there is shown a modified joint which is usable as a substitute for the abovementioned elastic joint 12 or 14.

The joint comprises a first bored outer race 43 into which one end of the cylindrical shaft proper 11 is inserted to achieve a splined connection therebetween. The shaft proper 11 contains a small amount of liquid 20. The first outer race, 43 is held by a ball bearing 42 which is, in turn, disposed in a housing 40 with an interposal of an annular elastic member 41 therebetween. A second bored outer race 45 is rotatably held in the housing 40 at a position facing the front of the first outer race 43. An annular seal member 44 is operatively disposed between the second outer race 45 and the housing 40. An output shaft 13 of a power plant (not shown) is inserted into the bore of the second outer race 45 to achieve a splined connection therebetween.

Between the first and second outer races 43 and 45, there is operatively disposed an inner race 46. More specifically, as shown in the drawing, the inner race 46 has axially opposed ends spacedly received in cylindrical recesses (no numerals) of the first and second outer races 43 and 45.

The cylindrical inner wall of each cylindrical recess is formed with a plurality of axially extending grooves which are spaced by equal distances. Similar to this, the cylindrical outer surface of the inner race 46 is formed with a plurality of axially extending grooves which are spaced by equal distances.

A plurality of balls 47 are operatively interposed between the cylindrical inner wall of the cylindrical recess of each outer race 43 or 45 and the cylindrical outer wall of the inner race 46, each ball being engaged with one of the grooves of the outer race 43 or 45 and one of the grooves of the inner race 46.

Accordingly, the first and second outer races 43 and 45 can rotate like a unit together with the inner race 46 and the balls 47.

Due to provision of the annular elastic member 41 and the universal connection achieved by the outer races 43 and 45 and the inner race 46, the associated end of the shaft proper 11 can move in a radial direction. Thus, the above-mentioned advantageous operation is equally expected from the shaft proper 11.

Figure 12:
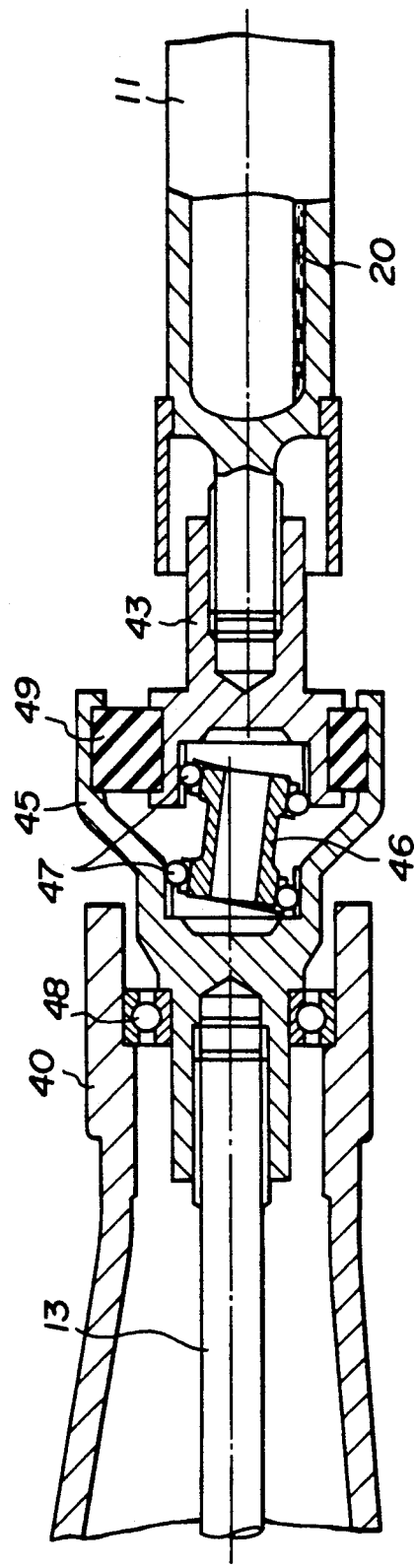
FIG. 12 is a view similar to FIG. 11, but showing another modified joint which is also usable in the present invention.
Figure 13:
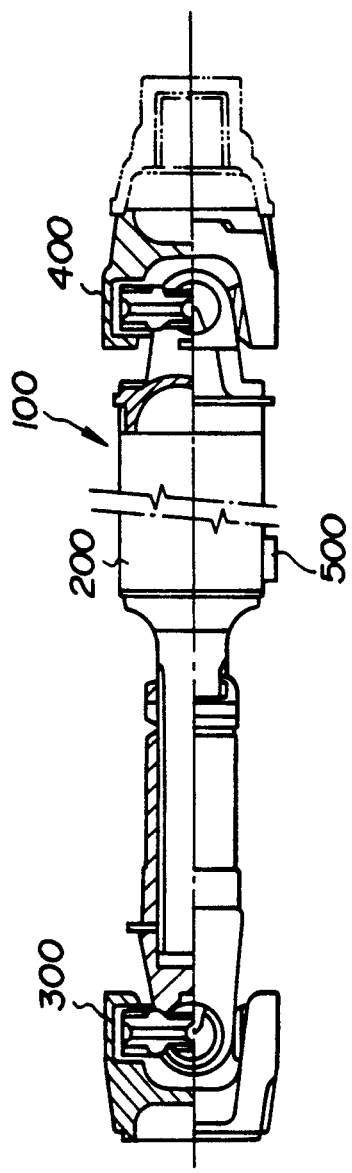
FIG. 13 is a sectional view of a conventional drive shaft assembly.

Referring to FIG. 12, there is shown another modified joint which is also usable as a substitute for the above-mentioned elastic joint 12 or 14.

The joint comprises a first bored outer race 43 into which one end of the cylindrical shaft proper 11 is inserted to achieve a splined connection therebetween. A second bored outer race 45 is rotatably held in a housing 40 with an interposal of a ball bearing 48 therebetween. An output shaft 13 of a power plant (not shown) is inserted into the bore of the second input race 45 to achieve a splined connection therebetween. The second outer race 45 is formed with a larger mouth portion which spacedly receives therein one end of the first outer race 43 as shown. An annular elastic member 49 is tightly disposed between the end of the first outer race 43 and the mouth portion of the second outer race 45.

Between the first and second outer races 43 and 45, there is operatively disposed an inner race 46 in substantially the same manner as has been described in the section of the joint of FIG. 11.

Due to provision of the annular elastic member 49 and the universal connection achieved by the outer races 43 and 45 and the inner race 46, the associated end of the shaft proper 11 can move in a radial direction. Thus, the above-mentioned advantageous operation is equally expected from the shaft proper 11.

Although, in the above-mentioned embodiments, liquid 20 is used for obtaining the advantageous operation of the shaft proper 11, fluid metal powder, beads or the like may be used as a substitute for the liquid 20.

What is claimed is:

1. A drive shaft assembly comprising:
   a cylindrical shaft having an axially extending cylindrical bore formed therein;
   a given amount of liquid contained in said bore of the cylindrical shaft, said liquid being movable in said bore in response to movement of said shaft;
   two joints connected to axially opposed ends of said shaft respectively; and
   means for permitting a radial displacement between one of said joints and the corresponding end of said shaft thereby to allow a pivotal movement of said shaft about a pivot point defined by the other joint.

2. A drive shaft assembly as claimed in claim 1, wherein said liquid is selected from a group consisting of water, water with rust inhibitor, and oil.

3. A drive shaft assembly as claimed in claim 1, further comprising a partition member sealingly disposed in said bore near said one joint and defining an enclosed chamber, wherein said liquid is contained in said enclosed chamber.

4. A drive shaft assembly as claimed in claim 3, wherein said partition member is annularly shaped so that said enclosed chamber has an annular form.

5. A drive shaft assembly as claimed in claim 3, further comprising a porous member tightly disposed in said enclosed chamber.

6. A drive shaft assembly as claimed in claim 3, further comprising a second partition member sealingly disposed in said bore near the other joint and defining a second enclosed chamber wherein said liquid is movably contained.

7. A drive shaft assembly as claimed in claim 6, further comprising means for permitting a radial displacement between the other joint and the corresponding end of said cylindrical shaft thereby to allow a pivotal movement of said cylindrical shaft about a second pivot point defined by said one joint.

8. A drive shaft assembly as claimed in claim 1, wherein said one joint further comprises a centering device for coaxially connecting said one joint and said cylindrical shaft.

9. A drive shaft assembly as claimed in claim 1, wherein said one joint further comprises an elastic axis joint type including a first member, a second member, and an elastic member operatively disposed between said first and second members, said elastic member elastically deforming when applied with an external force.

10. A drive shaft assembly as claimed in claim 9, wherein said first member includes a first shaft having a first portion; said second member includes a second portion defined by said cylindrical shaft; said elastic member includes an annular elastic member disposed between said first and second portions; and wherein said elastic axis joint type further comprises:
    a first group of bolts for connecting said first portion to said annular elastic member; and
    a second group of bolts for connecting said second portion to said annular elastic member.

11. A drive shaft assembly as claimed in claim 10, wherein said elastic axis joint type further comprises a center device including:
    a pin coaxially connected to said cylindrical shaft; and
    an elastic ring member coaxially connected to said first shaft, said elastic ring member having said pin coaxially received therein.

12. A drive shaft assembly as claimed in claim 10, wherein the other joint further comprises an elastic axis joint type including:
    a third shaft having a third portion;
    a fourth portion defined by said cylindrical shaft;
    a second annular elastic member disposed between said third and fourth portions;
    a third group of bolts for connecting said third portion to said second annular elastic member; and
    a fourth group of bolts for connecting said fourth portion to said second annular elastic member.

13. A drive shaft assembly as claimed in claim 10, wherein the other joint further comprises a Cardan joint.

14. A drive shaft assembly as claimed in claim 1, further comprising:
    a second cylindrical shaft having an axially extending cylindrical bore formed therein, said second cylindrical shaft having a first axial end connected to the other joint of said first cylindrical shaft; and
    an elastic axis joint type connected to a second axial end of said second cylindrical shaft so that said second cylindrical shaft is pivotal about said pivot point defined by said other joint.

15. A drive shaft assembly as claimed in claim 14, wherein said one joint of said first cylindrical shaft further comprises an elastic axis joint type including a first member, a second member, and an elastic member operatively disposed between said first and second members, said elastic member elastically deforming when applied with an external force; and
    said other joint of said cylindrical shaft comprises a Cardan joint.

16. A drive shaft assembly as claimed in claim 1, wherein said one joint further comprises:
    a first outer race connected to one end of said cylindrical shaft;
    a ball bearing for holding said first outer race;
    a housing wherein said ball bearing is disposed;
    an annular elastic member tightly interposed between said ball bearing and said housing;
    a second outer race rotatably disposed in said housing at a position facing the front of said first outer race;
    an annular seal member operatively disposed between said second outer race and said housing;
    an inner race having axially opposed ends spacedly received in cylindrical recesses respectively formed in mutually facing sides of said first and second outer races; and
    connecting means for uniting said inner race with said first and second outer races and permitting a pivotal movement of the inner race relative to said first and second outer races.

17. A drive shaft assembly as claimed in claim 16, wherein said connecting means further comprises:
- a plurality of balls operatively interposed between cylindrical inner walls of the cylindrical recesses of each outer race and a cylindrical outer wall of said inner race; and
- means for defining, on each of said cylindrical inner walls of the cylindrical recesses of each outer race and said cylindrical outer wall of said inner race, a plurality of axially extending grooves equally spaced, each ball engaging one of the grooves of each outer race and one of the grooves of said inner race.

18. A drive shaft assembly as claimed in claim 1, wherein said one joint further comprises:
- a first outer race connected to one end of said cylindrical shaft;
- a housing;
- a second outer race rotatably disposed in said housing, said second outer race forming a larger mouth portion for spacedly receiving therein one end of said first outer race;
- a ball bearing operatively disposed between said second outer race and said housing;
- an annular elastic member tightly disposed between said one end of said first outer race and said larger mouth portion of said second outer race;
- an inner race having axially opposed ends spacedly received in cylindrical recesses respectively formed in mutually facing sides of said first and second outer races; and
- connecting means for uniting said inner race with said first and second outer races and permitting a pivotal movement of the inner race relative to said first and second outer races.

19. A drive shaft assembly as claimed in claim 18, wherein said connecting means further comprises:
- a plurality of balls operatively interposed between cylindrical inner walls of the cylindrical recesses of each outer race and a cylindrical outer wall of said inner race; and
- means for defining, on each of said cylindrical inner walls of the cylindrical recesses of each outer race and said cylindrical outer wall of said inner race, a plurality of axially extending grooves equally spaced, each ball engaging one of the grooves of each outer race and one of the grooves of said inner race.

* * * * *